US008892718B2

United States Patent
Le et al.

(10) Patent No.: US 8,892,718 B2
(45) Date of Patent: Nov. 18, 2014

(54) MONITORING WEB SERVICE TRANSACTIONS

(75) Inventors: Bach Le, San Diego, CA (US); Tim Drees, San Diego, CA (US); Lenny Ratchitsky, San Diego, CA (US); Peter Kirwan, San Diego, CA (US); Rares Saftoiu, San Diego, CA (US)

(73) Assignee: NeuStar, Inc., Sterling, VA (US)

( * ) Notice: Subject to any disclaimer, the term of this patent is extended or adjusted under 35 U.S.C. 154(b) by 655 days.

(21) Appl. No.: 12/163,659

(22) Filed: Jun. 27, 2008

(65) Prior Publication Data

US 2009/0006614 A1    Jan. 1, 2009

Related U.S. Application Data

(60) Provisional application No. 60/946,931, filed on Jun. 28, 2007.

(51) Int. Cl.
*G06F 15/16* (2006.01)
*G06F 15/173* (2006.01)
*H04L 29/08* (2006.01)

(52) U.S. Cl.
CPC ............ *H04L 67/025* (2013.01); *H04L 67/125* (2013.01); *H04L 67/02* (2013.01)
USPC .......................................... 709/224; 709/219

(58) Field of Classification Search
CPC ...... G06Q 10/10; H04L 41/50; H04L 65/403; H04L 67/10; H04L 67/20; H04L 67/2814
USPC ............... 709/217–219, 223–226; 714/39, 47
See application file for complete search history.

(56) References Cited

U.S. PATENT DOCUMENTS

| | | | |
|---|---|---|---|
| 6,260,065 B1 * | 7/2001 | Leiba et al. .................... | 709/224 |
| 6,381,635 B1 | 4/2002 | Hoyer et al. | |
| 6,449,739 B1 * | 9/2002 | Landan ......................... | 714/47.2 |
| 7,028,223 B1 * | 4/2006 | Kolawa et al. ................. | 714/38 |
| 7,089,313 B2 | 8/2006 | Lee et al. | |
| 7,139,938 B2 | 11/2006 | Marwaha | |
| 2002/0046363 A1 * | 4/2002 | Nelson et al. .................... | 714/31 |
| 2003/0120464 A1 * | 6/2003 | Taft et al. ....................... | 702/186 |

(Continued)

OTHER PUBLICATIONS

PCT/US2008/068633, Written Opinion, Korean Intellectual Property Office, Jan. 19, 2009.

(Continued)

*Primary Examiner* — Peling Shaw
(74) *Attorney, Agent, or Firm* — Pattric J. Rawlins; Procopio, Cory, Hargreaves & Savitch LLP (57) ABSTRACT

Systems and methods for monitoring web service transactions include a monitoring server that is configured to monitor a web service transaction. The monitoring server allows a user to describe a sequence of web service requests that in combination define a web service transaction. The monitoring server sends out the web service requests in sequence to remote agents that are deployed in geographically diverse locations. The agents send the requests to the target web service and the results are provided back to the monitoring server. The monitoring server receives the results and then dynamically constructs the next request in the series based on the sequence of requests from the user and data from the response to a prior request. The dynamically constructed next request is then sent to remote agents for execution and the results are provided to the monitoring server.

20 Claims, 5 Drawing Sheets

(56) References Cited

U.S. PATENT DOCUMENTS

| | | |
|---|---|---|
| 2004/0015865 A1 | 1/2004 | Cirone et al. |
| 2005/0154939 A1 | 7/2005 | De Pauw et al. |
| 2005/0262240 A1 | 11/2005 | Drees et al. |
| 2006/0277606 A1 | 12/2006 | Yunus et al. |

OTHER PUBLICATIONS

PCT/US2008/068633, International Search Report, Korean Intellectual Property Office, Jan. 19, 2009.

Communication dated Aug. 3, 2011 and extended European Search Report for European Patent Application No. 08772190.8 dated Jul. 26, 2011.

\* cited by examiner

FIG. 1A

FIG. 2 http://www.youtube.com/api2_rest?user=webmetricsEng&dev_id=WWDnteO8wx8&method=youtube.users.list_favorite_videos

FIG. 5A

```
<?xml version="1.0" encoding="utf-8" ?>
<ut_response status="ok">
<video_list>
<video>
  <author>roundeye</author>
  <id>ju6t-yyoU8s</id>
  <title>smart car crash</title>
  <length_seconds>339</length_seconds>
  <rating_avg>3.00</rating_avg>
  <rating_count>275</rating_count>
  <description>crashing a smart car to test occupant survivability</description>
  <view_count>304972</view_count>
  <upload_time>1135157291</upload_time>
  <comment_count>143</comment_count>
  <tags>smart car crash</tags>
  <url>http://www.youtube.com/?v=ju6t-yyoU8s</url>
  <thumbnail_url>http://sjc-static11.sjc.youtube.com/vi/ju6tyyoU8s/2.jpg</thumbnail_url>
</video>
<video>
  <author>chabsies</author>
  <id>FHmdvcJmenM</id>
  <title>Car crash</title>
  <length_seconds>63</length_seconds>
  <rating_avg>3.60</rating_avg>
  <rating_count>716</rating_count>
  <description>car crash</description>
  <view_count>487822</view_count>
  <upload_time>1142272770</upload_time>
  <comment_count>379</comment_count>
  <tags>car crash</tags>
  <url>http://www.youtube.com/?v=FHmdvcJmenM</url>
  <thumbnail_url>http://sjl-static4.sjl.youtube.com/vi/FHmdvcJmenM/2.jpg</thumbnail_url>
</video>
</video_list>
</ut_response>
```

```
<?xml version="1.0" encoding="UTF-8" ?>
<SOAP-ENV:Envelope xmlns:SOAP-ENV="http://schemas.xmlsoap.org/soap/envelope/"
xmlns:xsi="http://www.w3.org/1999/XMLSchema-instance"
xmlns:xsd="http://www.w3.org/1999/XMLSchema">
<SOAP-ENV:Body>
<ns1:doSpellingSuggestion xmlns:ns1="urn:GoogleSearch"
SOAP-ENV:encodingStyle="http://schemas.xmlsoap.org/soap/encoding/">
                    <key xsi:type="xsd:string">000000000000000</key>
                    <phrase xsi:type="xsd:string">britney speers</phrase>
            </ns1:doSpellingSuggestion>
        </SOAP-ENV:Body>
</SOAP-ENV:Envelope>
```

FIG. 4A

```
<?xml version="1.0" encoding="UTF-8" ?>
<SOAP-ENV:Envelope xmlns:SOAP-ENV="http://schemas.xmlsoap.org/soap/envelope/"
xmlns:xsi="http://www.w3.org/1999/XMLSchema-instance"
xmlns:xsd="http://www.w3.org/1999/XMLSchema">
<SOAP-ENV:Body>
<ns1:doSpellingSuggestionResponse xmlns:ns1="urn:GoogleSearch" SOAP-
ENV:encodingStyle="http://schemas.xmlsoap.org/soap/encoding/">
                    <return xsi:type="xsd:string">britney spears</return>
            </ns1:doSpellingSuggestionResponse>
        </SOAP-ENV:Body>
</SOAP-ENV:Envelope>
```

Assign Variables — Assign Variables to Response
Variable Name | Variable RegEx | Nth match
TITLE | Title>(.*?)</Tit | 2
[Add]

FIG. 7A

```
PAGE 1 http://www.youtube.com/api2_rest
method get
formdatauser=webmetricsEng&method=youtube.users.list_favorite_videos&dev_id=WWDnteO
searchstring crash
description REST
END
```

```
#STEPS 2

PAGE 1 http://www.youtube.com/api2_rest
pagetimeout 3
method GET
formdata user=webmetricsEng&dev_id=WWDnteO8wx8&method=youtube.users.list_favorite_videos&
description REST
END varRegexnth VIDEOID4 4 id>(.*?)</id
varRegex VIDEOID1 id>(.*?)</id
varRegexnth VIDEOID5 5 id>(.*?)</id
resetheaders
resettimeout PAGE 2 http://api.google.com/search/beta2
header Content-Type text/xml
formdatarawnewline   <?xml version='1.0' encoding='UTF-8'?>
formdatarawnewline   <SOAP-ENV:Envelope xmlns:SOAP-ENV="http://schemas.xmlsoap.org/soap/envelope/" xmlns:xsi="http://
www.w3.org/1999/XMLSchema-instance" xmlns:xsd="http://www.w3.org/1999/XMLSchema">
formdatarawnewline     <SOAP-ENV:Body>
formdatarawnewline       <ns1:doGoogleSearch xmlns:ns1="urn:GoogleSearch"
formdatarawnewline           SOAP-ENV:encodingStyle="http://schemas.xmlsoap.org/soap/encoding/">
formdatarawnewline         <key xsi:type="xsd:string">4EuPakFQFHl5uVHBmSfazd9bSrYa9y+Z</key>
formdatarawnewline         <q xsi:type="xsd:string"><VAR VIDEOID5></q>
formdatarawnewline         <start xsi:type="xsd:int">0</start>
formdatarawnewline         <maxResults xsi:type="xsd:int">10</maxResults>
formdatarawnewline         <filter xsi:type="xsd:boolean">true</filter>
formdatarawnewline         <restrict xsi:type="xsd:string"></restrict>
formdatarawnewline         <safeSearch xsi:type="xsd:boolean">false</safeSearch>
formdatarawnewline         <lr xsi:type="xsd:string"></lr>
formdatarawnewline         <ie xsi:type="xsd:string">latin1</ie>
formdatarawnewline         <oe xsi:type="xsd:string">latin1</oe>
formdatarawnewline       </ns1:doGoogleSearch>
formdatarawnewline     </SOAP-ENV:Body>
formdatarawnewline   </SOAP-ENV:Envelope>
pagetimeout 3
method POST
searchstring YouTube.com
description SOAP
END resetheaders
resettimeout
```

FIG. 7C

MONITORING WEB SERVICE TRANSACTIONS

RELATED APPLICATION

The present application claims priority to U.S. provisional patent application Ser. No. 60/946,931 filed Jun. 28, 2007, which is incorporated herein by reference in its entirety.

BACKGROUND

1. Field of the Invention

The present invention is generally related to website monitoring and more specifically related to the monitoring of web service transactions.

2. Related Art

In conventional web service monitoring, it is difficult to test an online web service from a variety of remote locations on a regular interval. Typical solutions hard code a series of requests and related values for use in each step of the web service transaction. These conventional solutions are problematic and very labor intensive because they require manually updating the hard coded values each time the web service transaction is monitored. Data entry errors are introduced by operators that result in incorrect results that then require additional monitoring at high labor cost. Additionally, the conventional solutions are unable to scale up to the necessary bandwidth required to monitor a web service transaction from remote locations on a regular interval. Therefore, what is needed is a system and method that overcomes these significant problems found in the conventional systems as described above.

SUMMARY

Accordingly, described herein are systems and methods for monitoring web service transactions. A monitoring server is configured to monitor a web service transaction, which is defined as a series of steps that include requests to one or more web services that can be hosted by one or more different servers such that each step can be discrete web service request. The monitoring server allows a user to describe a sequence of web service requests that in combination define a web service transaction. The monitoring server sends out the various web service requests in sequence to remote agents that are deployed in geographically diverse locations. The agents send the requests to the target web service and the results are provided back to the monitoring server. The monitoring server then dynamically constructs the next request in the series based on the sequence of requests from the user and data from the response to a prior request and sends the dynamically constructed next request to remote agents for execution. In this fashion a web service transaction can be monitored in a way that approximates the actual use of web services in the field. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide systems and methods for monitoring of web service transactions. For example, one method as disclosed herein allows for a monitor server to receive a sequence of web service requests from a user. The monitor server then causes each request to be sent to the particular web service and subsequent requests are dynamically constructed such that they may include information received by the monitor server in response to a prior web service request. The result of the processing of the sequence of web service requests allows the web service transaction to be automatically monitored without user involvement.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Web services are becoming an industry standard mechanism of sharing data and they enable the linking together (serial or parallel or both) of applications hosted by one or more web servers. An example of a web service transaction can be illustrated by a simple car insurance application. An applicant fills out a request for insurance form at a particular car insurance website. The data collected in the insurance form is then encapsulated into a web service friendly format (XML, JSON, etc). That data is then sent using REST or SOAP to the department of motor vehicles ("DMV") web service for a record check. The response from the DMV comes back and is modified and then submitted to a state and or federal government crime web service to see if the applicant has a criminal history. The response from the crime web service comes back and is modified then submitted to a financial web service for a credit check. The aggregation of all of the responses from the various web services is then packaged and provided to the particular car insurance website that was offering the insurance product where the decision weather or not to approve the application can be made.

Another example of a web service transaction is a mashup. For example, at a real estate website, a user enters the zip code of the area in which he or she is interested in purchasing or renting a home. The zip code is then sent to a classifieds web service to determine what rental and for sale listings are available in that zip code. The data from the classifieds web service is then supplied to a mapping web service and the user is then presented with a map of apartments and or homes that are for rent or sale in the desired area code.

Web services allow machines to be interoperable regardless of architectural differences in software or hardware. A web service receives a request for information, processes the request, and returns the information requested—typically in the form of extensible markup language ("XML") data or similar languages used in the transmission of information across the internet. Types of web services include SOAP (formerly an acronym for Simple Object Access Protocol although that definition for the acronym was dropped with SOAP version 1.2), representational state transfer ("REST"), hypertext transfer protocol/hypertext markup language ("HTTP/HTML"), and extensible markup language—remote procedure call ("XML-RPC").

SOAP is a standard maintained by the World Wide Web Consortium ("W3C"). SOAP web services are defined by a web services description language ("WSDL") file. This file contains the information needed to generate a properly formatted request and describes the format of the response. Setting up web services to monitor a SOAP web service requires a properly configured WSDL file. SOAP requests are typically sent using a POST HTTP request method.

REST does not have a standard that is maintained by the W3C. Accordingly, the definition of the format for requests and replies are designed and implemented by the company/person offering the web service. REST usage is very popular because of its simplicity and ease of implementation. REST requests are typically sent using a GET HTTP request method where all parameters are passed in the URL. However, the response from the web service is typically XML, JavaScript Object Notation ("JSON") or something similar. POST can also be used as a request format for REST.

HTTP/HTML/TEXT is used for those web services that return strings of text or HTML rather than XML. This type of web service is similar to REST in that the format for the request and response is defined by the designer of the web service. One example of this is requesting information from a page that will do some sort of processing and returns a message indicating whether it was successful or not.

Hash message authentication code ("HMAC") and message-digest algorithm 5 ("MD5") are types of message authentication codes calculated using a cryptographic hash function in combination with a secret key. This is used in the context of web services to encode the request in such a way as to ensure its integrity, and to distinguish one request from another. For example, pieces of the web service request can be encoded using HMAC or MD5 algorithms. Other encoding techniques may also be used as will be understood by those skilled in the art.

Figure 1A:
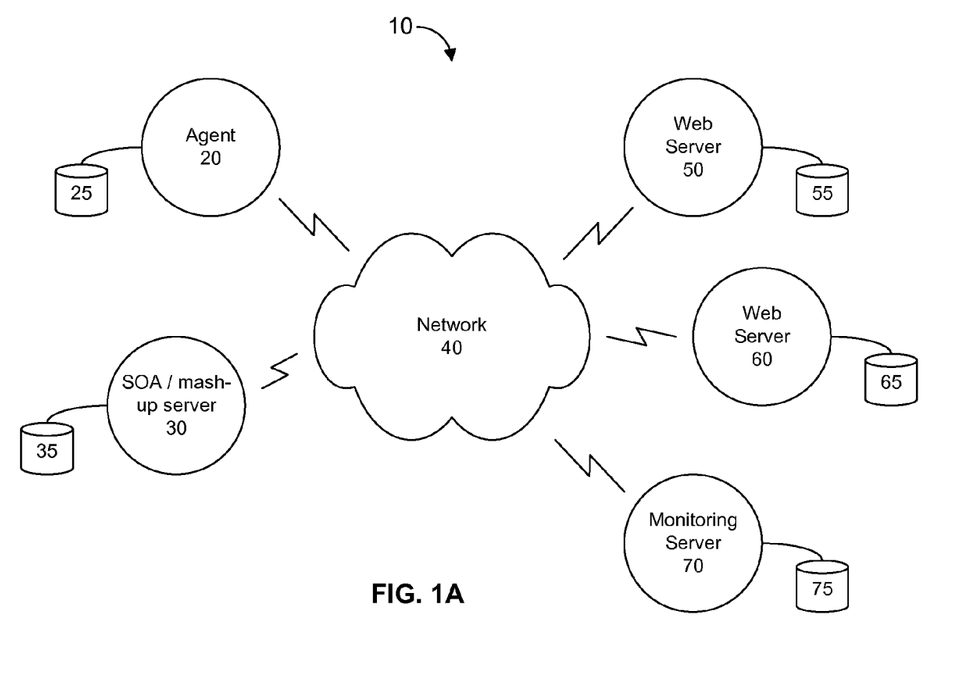
FIG. 1A is a network diagram illustrating an example system for web service transaction monitoring according to an embodiment of the present invention.

FIG. 1 is a network diagram illustrating an example system 10 for web service transaction monitoring according to an embodiment of the present invention. In the illustrated embodiment, the system 10 comprises a network 40 that communicatively links a plurality of agents 20 (only one is shown for simplicity), a plurality of web servers 50 and 60 (only two are shown for simplicity), a monitoring server 70, and an service oriented architecture ("SOA")/mash-up server 30. Each of the computing devices shown in FIG. 1 is configured with an associated data storage area.

In practice, the SOA server 30 employs the service oriented architecture to provide mash-ups to consumers or for internal use, for example to track sales information, accounting information, or the like. The various web services used by the SOA server 30 may be hosted by a variety of web servers such as web server 50 and web server 60 as well as other web servers (not shown). The SOA server 30 has a need to monitor these various web servers (including 50 and 60) to ensure that they are operating as needed. In one embodiment, a mashup could also be correlated by a web browser alone without the need for a separate server doing the aggregation.

The monitoring server 70 is configured to perform the monitoring of web service transactions. The monitoring server 70 is configured to monitor a single web service, for example a web service provided by web server 50. The monitoring server 70 is also configured to monitor a plurality of web services that are intentionally used in sequence to achieve a desired result. Each of the plurality of web services may be hosted by a separate web server (e.g., web server 50). Alternatively, a single web server 50 may also host more than one web service. Additionally, the use of web services as part of a web service transaction can be sequential and may also be in parallel.

The monitoring server 70 allows for a sequence of web service requests to be created and this sequence of requests is carried out by the various agents 20 under the control of the monitoring server 70. The monitoring server 70 is also configured to store data that is received in response to a request, for example in data storage or as one or more variables in volatile memory. The response data can then be used by the monitoring server 70 in subsequent requests. Advantageously, this use of response data for subsequent requests approximates the fashion in which SOA servers such as SOA server 30 actually employ web services that may be provided by web servers 50 and 60.

The monitoring server 70 is also configured to validate the data that is received in response to the various requests that are processed in order to determine the status of the various web servers 50 and 60 that are used in a sequence of web service requests that define a web service transaction.

Figure 6:
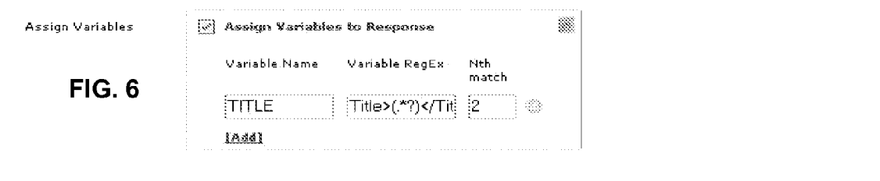
FIG. 6 is a dialog box illustrating an example interface for defining a variable according to an embodiment of the present invention.

The monitoring server provides the ability to assign values from a response at any given step to a variable and reuse the data stored in that variable in any subsequent requests. This ability allows the monitoring server to do an nth match for anything in the page. For example, FIG. 6 is a dialog box illustrating an example interface for defining a variable according to an embodiment of the present invention. As shown, the variable being defined is named "TITLE" and the variable is to be assigned the contents between the "Title>" and "</Title" strings. The nth match column is optional in that if a value is not specified, it will default to the first match however if the strings "Title>" and "</Title" appear in multiple places, it will return the nth match. As shown in FIG. 6, n is the 2nd match.

For example, given a web service that provides the following response:

```
<output>
    <item>123456789</item>
    <item>987654312</item>
</output>
```

To assign the value 123456789 to a variable called ITEM, the word "ITEM" is entered into the variable name field, the value "item>(.*?)</item" is entered into the variable regex field and the third field is either left blank or the number one is entered into the nth match field. When the above data is receive in response to a request to the web service, the response will be parsed and the variable ITEM will be assigned the value 123456789. Alternatively, to assign the value 987654312 to the variable ITEM, the value in the "nth match" field can be set to the number two.

Figure 1B:
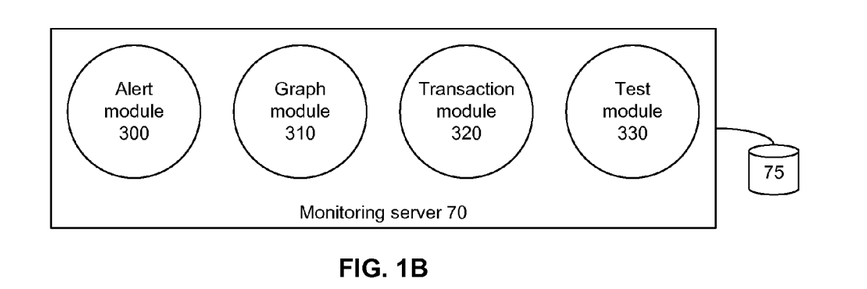
FIG. 1B is a block diagram illustrating an example monitoring server according to an embodiment of the present invention.

FIG. 1B is a block diagram illustrating an example monitoring server 70 according to an embodiment of the present invention. In the illustrated embodiment, the monitoring server 70 comprises an alert module 300, a graph module 310, a transaction module 320, and a test module 330.

The alert module 300 is configured to provide an alert of some sort (e.g., email, text message, phone call) in response to a certain event. For example, timeout errors, connectivity errors, and content errors may each cause an alert. Advantageously, if a web service provides XML responses, alerts (e.g., diagnostic emails) include both header information and content. In one embodiment, the diagnostic email is sent with one file attached that includes the header information and a second file attached that includes the XML content so that when a user opens an XML attachment, it will render properly in the browser, otherwise the browser will try to interpret it as html and only display the contents of the tags and not the tags themselves.

The graph module 310 is configured to provide illustrative information regarding the status of individual web services and web service transactions that are being monitored. Graphs for individual web services and web service transactions include (1) load time graphs (response time by period, transaction step averages, transaction steps over time); (2) city graphs (response time—city by city (average), response time—city by city (scatter), uptime & average response time—all cities); (3) error graphs (errors by type, errors by time); and (4) performance trending graphs (uptime table, transfer rate, performance variation, worst hour/worst day). Other graphs can also be included.

The transaction module 320 allows a user to configure a web service transaction that includes a plurality of requests. The transaction module allows a user to define variables that will store data that can be used in subsequent requests. The data in a variable can be predefined static data or it may be dynamically defined from prior response data or from data in a local file or database that may change over time.

Additionally, for SOAP requests using the POST method, the transaction module 320 allows users to configure fields that include: (a) service location: where the web service is located; (b) SOAPAction: usually optional but some web services require it to be set in the header of the transaction; (c) XML message: the entire request that will be sent to the web service; (d) verify keyword: keyword we can use to verify a successful transaction; and (e) error keyword: keyword we can use to verify an unsuccessful transaction.

For SOAP requests using the GET method, the transaction module 320 allows users to configure fields that include: (a) service location: where the web service is located; (b) parameter name/value pair—e.g., parameter name: name of data to be passed/parameter value: value of data to be passed; (c) complete request: users can opt to use this option to set the URL with all of the data included in the URL; (d) verify keyword: keyword to verify a successful transaction; and (e) error keyword: keyword to verify an unsuccessful transaction.

For REST requests using the POST method, the transaction module 320 allows users to configure fields that include: (a) service location: where the web service is located; (b) XML message: the XML block that we will submit to the web service; (c) verify keyword: keyword to verify a successful transaction; and (d) error keyword: keyword to verify an unsuccessful transaction.

For REST requests using the GET method, the transaction module 320 allows users to configure fields that include: (a) service location: where the web service is located; (b) parameter name/value pair—e.g., parameter name: name of data to be passed/parameter value: value of data to be passed; (c) complete request: users can opt to use this option to set the URL with all of the data included in the URL; (d) verify keyword: keyword to verify a successful transaction; and (e) error keyword: keyword to verify an unsuccessful transaction.

For web service requests that return HTML or TEXT, the transaction module 320 allows users to configure fields that include: (a) service location: where the web service is located; (b) parameter name/value pair—e.g., parameter name: name of data to be passed/parameter value: value of data to be passed; (c) complete request: users can opt to use this instead of the parameter name/value pair but will have to specify the entire URL; (d) verify keyword: keyword to verify a successful transaction; and (e) error keyword: keyword to verify an unsuccessful transaction.

Once a web service transaction has been set up for monitoring, the transaction module 320 is configured to execute the monitoring in an automatic fashion. This function may also be separated out in alternative embodiments to provide separation between live production monitoring and the creation and testing of monitoring sequences.

The test module 330 is configured to allow manual or automated testing of a web service monitoring sequence to ensure the settings are correct before automated monitoring begins.

Figure 2:
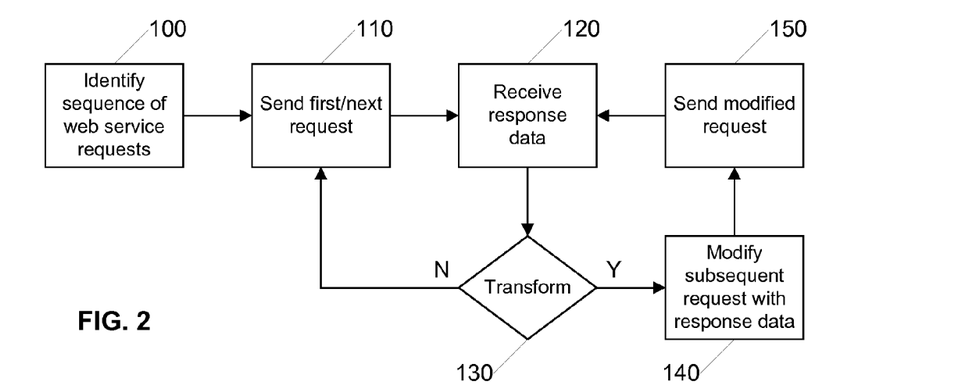
FIG. 2 is a flow diagram illustrating an example process for using data in a subsequent transaction according to an embodiment of the present invention.

FIG. 2 is a flow diagram illustrating an example process for using response data from a prior request in a subsequent request according to an embodiment of the present invention. In one embodiment, this process may be implemented by the monitoring server previously described with respect to FIG. 1. Initially, in step 100, the monitoring server identifies a predetermined sequence of web service requests that are desired to be monitored. This sequence of web service requests define a web service transaction and may be provided by a user through a user interface on the monitoring server. The sequence of web service transactions can be predetermined by an administrator of the SOA server, for example.

Next, in step 110 the first request in the web service transaction is sent to the provider of the web service. In one embodiment, the request may be sent to the web service provider by a plurality of geographically diverse agents operating under the control of the monitoring server. Next, in step 120 the response is received from the web service provider. If the data from the response is to be transformed (i.e., used in a subsequent request), as determined in step 130, a subsequent request in the predetermined list is then modified with the prior response data. The modified request is then sent, as shown in step 150. In one embodiment, the modified request may be the next request that is sent as part of the overall web service transaction or it may be a subsequent request that is sent two or more requests later. If the data is not to be transformed, the monitoring server then sends the next request as shown in step 110. The process continues until the sequence of web service requests that comprise the web service transaction is exhausted. The transformation process can modify data used in the most recent response, remove data, add predefined static data or add dynamic variables, e.g., date, time, and random numbers, just to name a few types of dynamic data.

Figure 3:
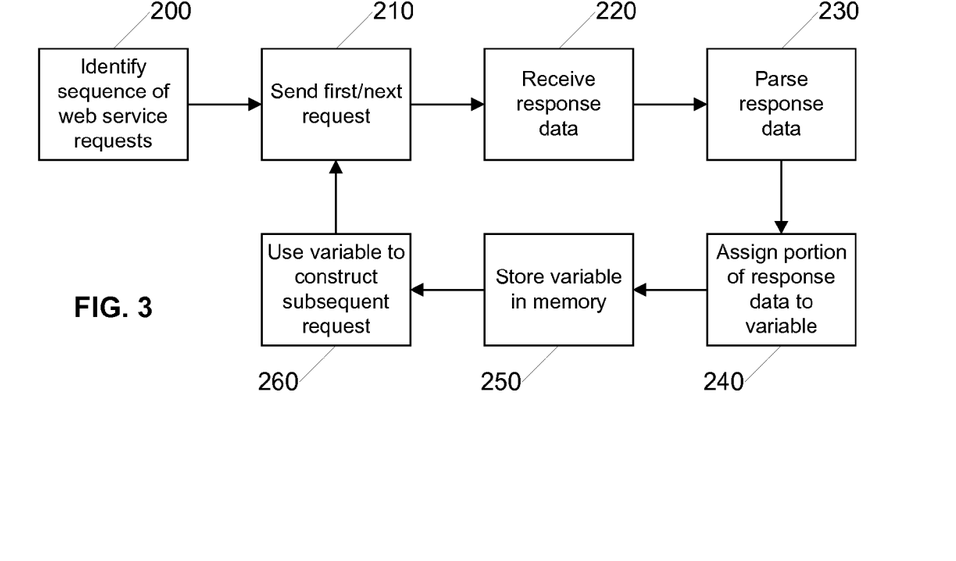
FIG. 3 is a flow diagram illustrating an example process for variable assignment according to an embodiment of the present invention.

FIG. 3 is a flow diagram illustrating an example process for variable assignment according to an embodiment of the present invention. In one embodiment, this process may be implemented by the monitoring server previously described with respect to FIG. 1. Initially, in step 200, the monitoring server identifies a predetermined sequence of web service requests that are desired to be monitored, as described with respect to FIG. 2. Next, in step 210 the first request is sent to the web service provider and then in step 220 the response is received from the web service provider. In step 230, the response is parsed by the monitoring server to identify particular portions of the response data. These one or more particular portions of the response data are then assigned to variables in step 240 and the variables are stored in memory on the monitoring server for later use, as shown in step 250. In alternative embodiments, the portion of response data can be stored in one or more files, stored in a database, a register or some other form of storage that does not involve the use of a variable. In a subsequent request, either the next request or perhaps two or three requests later in the web service transaction, the data from one or more variables can be used to construct the request, as shown in step 260. This dynamically constructed request is then sent by the monitoring server, as shown in step 210. As previously described with respect to FIG. 2, when stored data is used to dynamically construct a subsequent request, the subsequent request can be modified by changing, deleting, or adding static or variable driven data to the request.

Figure 4A:
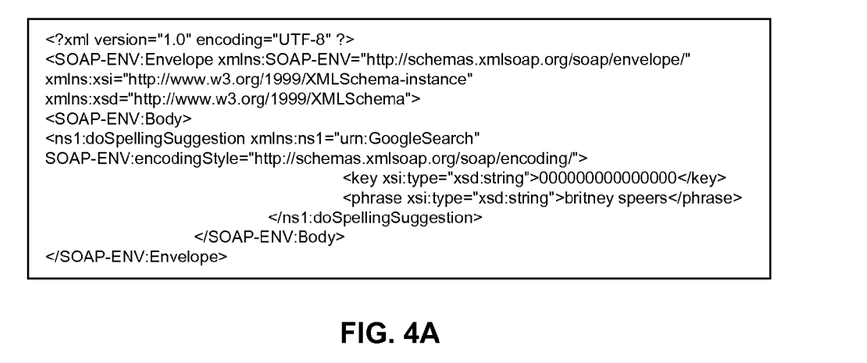
FIGS. 4A and 4B are code sections that illustrate an example of a web service SOAP request according to an embodiment of the present invention.
Figure 4B:
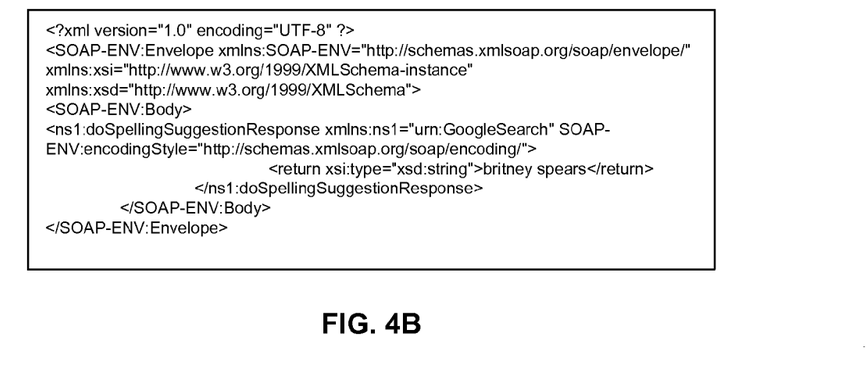

FIGS. 4A and 4B are code sections that illustrate an example of a web service SOAP request sent to a spelling suggestion web service (4A) and the corresponding response (4B). In the request message there is a key field, which are typically used by web services for authentication. For example, a unique key provided by the web service can be used to authenticate the user/request.

Figure 5A:
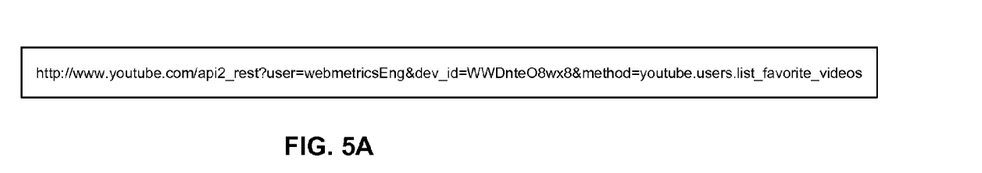
FIGS. 5A and 5B are code sections that illustrate an example of a web service REST request according to an embodiment of the present invention.
Figure 5B:
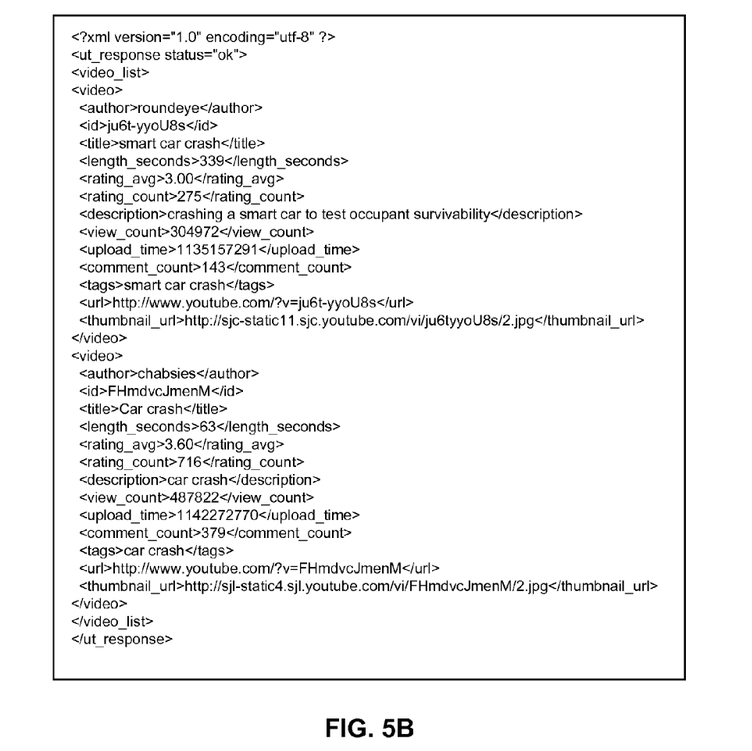

FIGS. 5A and 5B are code sections that illustrate an example of a web service REST request sent to youtube (5A) and the corresponding response (5B). In one embodiment, REST requests are implemented using GET. Additionally, requests are often part of the uniform resource locator ("URL") as shown in FIG. 5A. The request in FIG. 5A includes a unique identifier (dev_id) that is used for similar purposes as the SOAP unique identifier. The request in FIG. 5A was seeking information regarding favorite videos and in the response shown in FIG. 5B, two videos are identified. One video is titled "smart car crash" and the second video is titled "Car crash."

Figure 7A:
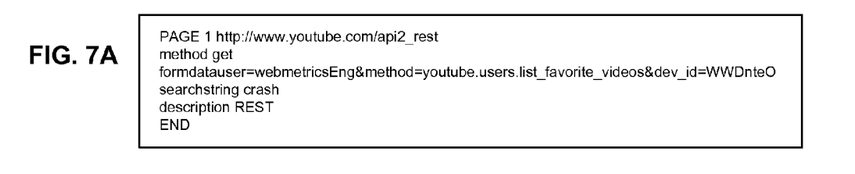
FIG. 7A is a code section that illustrates an example REST web service script according to an embodiment of the present invention.
Figure 7B:
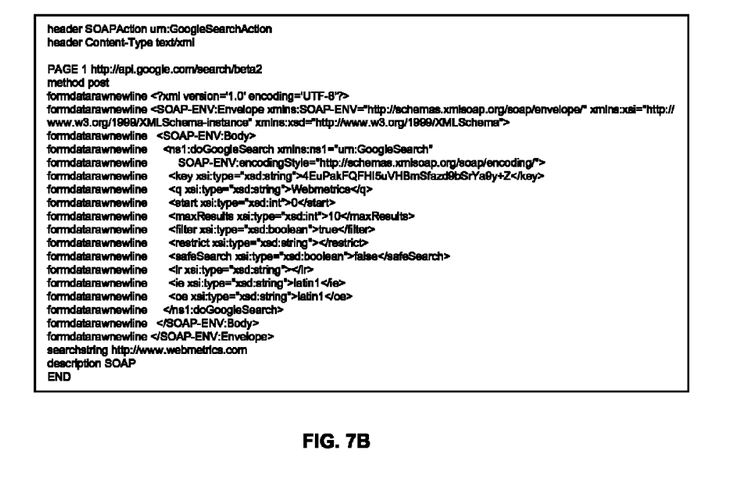
FIG. 7B is a code section that illustrates an example SOAP web service script according to an embodiment of the present invention.
Figure 7C:
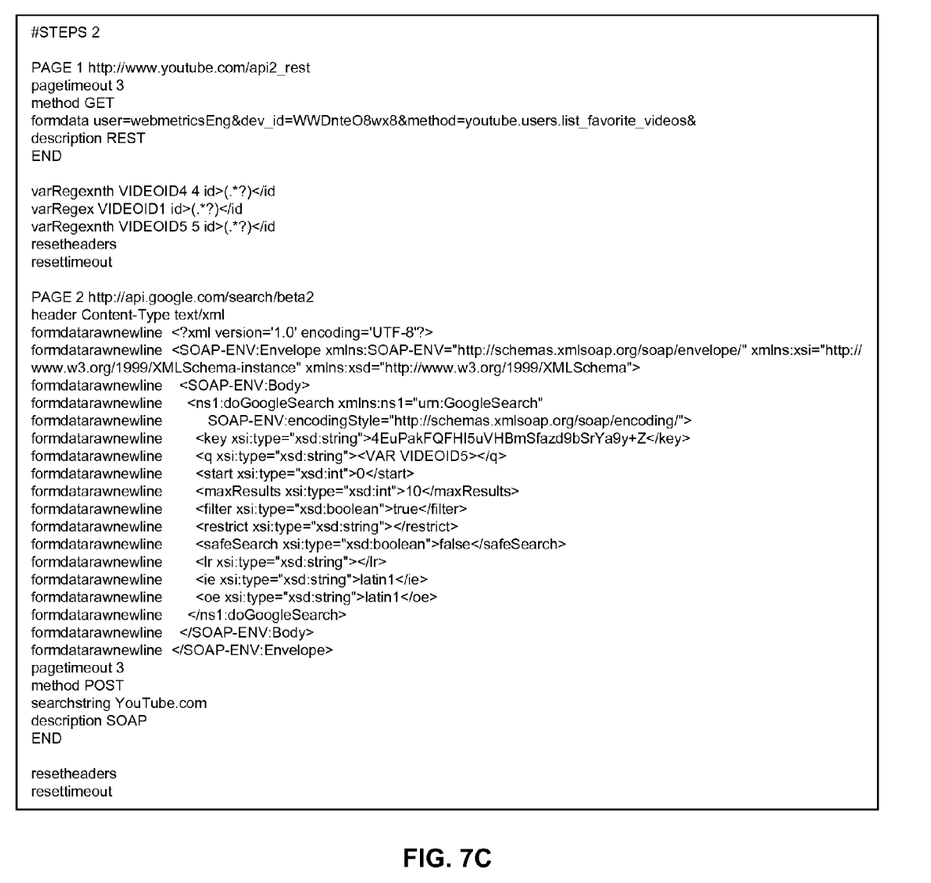
FIG. 7C is a code section that illustrates an example web service transaction script according to an embodiment of the present invention.

FIGS. 7A-7C are example web service transaction scripts that can be used for automated monitoring using dynamic data obtained from prior responses in the monitoring sequence in subsequent requests of the monitoring sequence.

Figure 8:
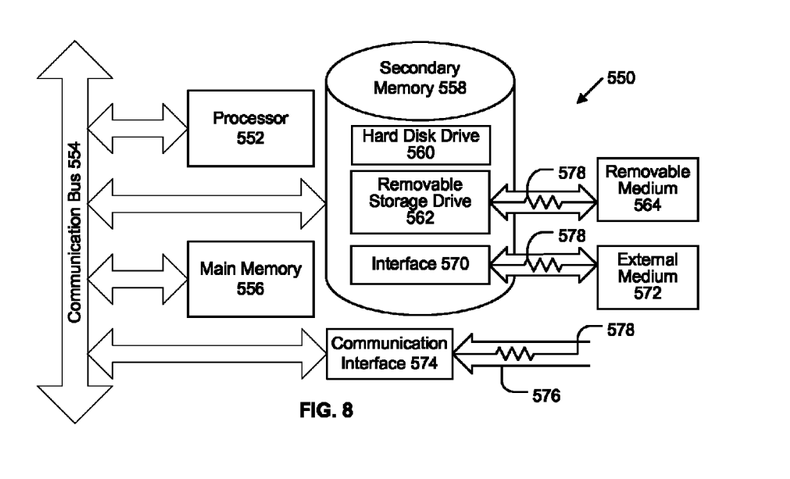
FIG. 8 is a block diagram illustrating an example computer system that may be used in connection with various embodiments described herein.

FIG. 8 is a block diagram illustrating an example computer system 550 that may be used in connection with various embodiments described herein. For example, the computer system 550 may be used in conjunction with a monitoring server, an SOA server, an agent, or a web server as previously described with respect to FIG. 1. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any non-transitory media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A computer implemented method for automatic monitoring of a web service transaction comprising a plurality of requests to one or more web services, the method comprising:
receiving a web service transaction comprising a sequence of two or more web service requests for two or more different web services hosted by two or more different web servers, wherein the two or more web service requests comprise at least a first web service request and a second web service request, and wherein the second web service request is different than the first web service request;
storing the web service transaction in a data storage area; and
periodically executing the web service transaction and recording the results of said execution, wherein executing the web service transaction comprises
executing the first web service request for a first web service hosted by a first web server,
receiving a response to the first web service request, the response comprising at least one value,
modifying said second web service request using the at least one value, and
executing said modified second web service request for a second web service which is different than the first web service and which is hosted by a second web server that is remote from the first web server.

2. The method of claim 1, further comprising sending an alert when the results of said execution meet a predetermine criteria.

3. The method of claim 1, wherein recording the results comprises storing the results of each web service request that is executed.

4. The method of claim 1, wherein modifying said second web service request using the at least one value comprises including the at least one value in said second web service request.

5. The method of claim 1, wherein periodically executing the web service transaction comprises periodically executing the two or more web service requests by, for each of the two or more web service requests:
sending the web service request to one or more of a plurality of geographically diverse agents; and,
by each of the one or more geographically diverse agents, sending the web service request to a web service provider.

6. The method of claim 1, wherein executing the first web service request comprises sending the first web service request to a first web service provider, and wherein executing the second web service request comprises sending the second web service request to a second web service provider which is different than the first web service provider.

7. The method of claim 1, further comprising:
receiving a definition of a variable from a user; and
parsing the response to the first web service request to identify the at least one value using the definition of the variable.

8. A non-transitory computer readable medium having stored thereon one or more sequences of instructions for causing one or more microprocessors to perform the steps for automatic monitoring of a web service transaction comprising a plurality of requests to one or more web services, the steps comprising:
receiving a web service transaction comprising a sequence of two or more web service requests for two or more different web services hosted by two or more different web servers, wherein the two or more web service requests comprise at least a first web service request and a second web service request, and wherein the second web service request is different than the first web service request;
storing the web service transaction in a data storage area; and
periodically executing the web service transaction and recording the results of said execution, wherein executing the web service transaction comprises
executing the first web service request for a first web service hosted by a first web server,
receiving a response to the first web service request, the response comprising at least one value,
modifying said second web service request using the at least one value, and
executing said modified second web service request for a second web service which is different than the first web service and which is hosted by a second web server that is remote from the first web server.

9. The computer readable medium of claim 8, wherein the steps further comprise sending an alert when the results of said execution meet a predetermine criteria.

10. The computer readable medium of claim 8, wherein recording the results comprises the step of storing the results of each web service request that is executed.

11. The computer readable medium of claim 8, wherein modifying said second web service request using the at least one value comprises including the at least one value in said second web service request.

12. The computer readable medium of claim 8, wherein periodically executing the web service transaction comprises periodically executing the two or more web service requests by, for each of the two or more web service requests:
sending the web service request to one or more of a plurality of geographically diverse agents; and,
by each of the one or more geographically diverse agents, sending the web service request to a web service provider.

13. The computer readable medium of claim 8, wherein executing the first web service request comprises sending the first web service request to a first web service provider, and wherein executing the second web service request comprises sending the second web service request to a second web service provider which is different than the first web service provider.

14. The computer readable medium of claim 8, wherein the steps further comprise:
receiving a definition of a variable from a user; and
parsing the response to the first web service request to identify the at least one value using the definition of the variable.

15. A system for automatic monitoring of a web service transaction comprising a plurality of requests to one or more web services and corresponding responses, the system comprising:
one or more remote agents communicatively coupled with a monitoring server and one or more target web services via a communication network; and
a monitoring server communicatively coupled with the one or more remote agents and the one or more target web services via the communication network said monitoring server comprising a non-transitory computer readable medium configured to store computer executable programmed modules and a processor communicatively coupled with the non-transitory computer readable medium configured to execute programmed modules stored therein;

wherein the monitoring server comprises a transaction module stored in the non-transitory computer readable medium and configured to be executed by the processor to periodically execute a web service transaction comprising a sequence of two or more web service requests for two or more different web services hosted by two or more different web servers; and wherein data received in response to a prior web service request sent to a first web service hosted by a first web server is used to modify a subsequent and different web service request in the sequence of two or more web service requests, the transaction module further configured to execute the modified web service request for a second web service which is different than the first web service and which is hosted by a second web server that is remote from the first web server, and analyze the results of the sequence of two or more web service requests.

16. The system of claim 8, wherein the monitoring server further comprises an alert module configured to send an alert upon identification of a predetermined condition.

17. The system of claim 15, wherein the monitoring server further comprises a data storage area configured to store the sequence of two or more web service requests and data received in response to a web service request.

18. The system of claim 17, wherein the monitor server is configured to parse data received in response to a web service request and store a portion of said data in a variable in said data storage area.

19. The system of claim 15, wherein the periodic execution of the web service transaction comprises periodically executing the two or more web service requests by, for each of the two or more web service requests:

sending the web service request to at least one of the one or more remote agents; and, by the at least one remote agent, sending the web service request to a web service provider.

20. The system of claim 15, wherein the periodic execution of the web service transaction comprises:

periodically sending at least a first one of the two or more web service requests to a first web service provider; and periodically sending at least a second one of the two or more web service requests to a second web service provider which is different than the first web service provider.

* * * * *